United States Patent [19]

Chiao

[11] Patent Number: 5,705,450
[45] Date of Patent: Jan. 6, 1998

[54] A1N SINTERED BODY CONTAINING A RARE EARTH ALUMINUM OXYNITRIDE AND METHOD TO PRODUCE SAID BODY

[75] Inventor: Yi-Hung Chiao, Midland, Mich.

[73] Assignee: The Dow Chemical Company, Midland, Mich.

[21] Appl. No.: 767,894

[22] Filed: Dec. 17, 1996

[51] Int. Cl.$^6$ .................................................. C04B 35/581
[52] U.S. Cl. ................................................ 501/98; 264/65
[58] Field of Search ................................ 501/98; 264/65

[56] References Cited

U.S. PATENT DOCUMENTS

| | | | |
|---|---|---|---|
| 4,766,097 | 8/1988 | Shinozaki et al. | 501/98 |
| 4,847,221 | 7/1989 | Horiguchi et al. | 501/98 |
| 5,036,026 | 7/1991 | Yamakawa et al. | 501/98 |
| 5,061,664 | 10/1991 | Matsudaira et al. | 501/98 |
| 5,063,183 | 11/1991 | Taniguchi et al. | 501/96 |
| 5,147,832 | 9/1992 | Shimoda et al. | 501/96 |
| 5,154,863 | 10/1992 | Miyahara | 264/65 |
| 5,294,388 | 3/1994 | Shimoda et al. | 501/98 |
| 5,306,679 | 4/1994 | Shimoda et al. | 501/98 |
| 5,508,240 | 4/1996 | Komatsu et al. | 501/98 |

FOREIGN PATENT DOCUMENTS

| | | |
|---|---|---|
| 0393524 | 10/1990 | European Pat. Off. . |
| 0548424 | 6/1993 | European Pat. Off. . |

OTHER PUBLICATIONS

Watari et al., "Effect of Rare–Earth Oxide Addition on the Thermal Conductivity of Sintered Aluminum Nitride," *Journal of Materials Science Letters* 11, (1992), pp. 1508–1510 no month.

Chemical Abstracts, 108:117668p (1988) no month.

Chemical Abstracts, 109:133608y (1988) no month.

Chemical Abstracts, 110:178356y (1989) no month.

Chemical Abstracts, 110:198036z (1989) no month.

Chemical Abstracts, 111:62888q (1989) no month.

Chemical Abstracts, 112:41392d (1990) no month.

Derwent Publications, J5 9207–882–A, Nov. 1984.

*Primary Examiner*—Karl Group

[57] ABSTRACT

A sintered body is formed by mixing an aluminum nitride powder with an oxide of Dy, Pr, Nd, Sm, or mixture thereof, and, optionally, an oxide of Eu, Ce, or mixture thereof, to form an admixture and heating the admixture in a non-oxidizing non-reducing atmosphere to a temperature for a time sufficient to densify the admixture to greater than 90% of theoretical, wherein the sintered body contains about 1.4 to about 4.0 mole percent of the rare earth element according to the equation, $$\text{Mole \% of Rare Earth} = \frac{\Sigma\, MO_{1.5}\text{ moles}}{\Sigma\, MO_{1.5}\text{ moles} + AlN\text{ moles}}(100)$$

where M is the rare earth element, O is oxygen and $MO_{1.5}$ is a rare earth oxide in which the rare earth element has a valence of $^+3$ with the proviso that the amount of Ce, Eu, or mixture thereof, is at most about 55% by moles of the rare earth present in the body as expressed by $MO_{1.5}$.

13 Claims, No Drawings

5,705,450

AlN SINTERED BODY CONTAINING A RARE EARTH ALUMINUM OXYNITRIDE AND METHOD TO PRODUCE SAID BODY

FIELD OF THE INVENTION

This invention relates to a high density, high thermal conductivity, aluminum nitride sintered body.

BACKGROUND OF THE INVENTION

Aluminum nitride (AlN) sintered bodies having high thermal conductivities are used as electrical insulators where dissipation of heat is important. An example is a substrate for a semiconductor device such as a multi-chip module. In practical application, the AlN ceramic has to meet certain minimum requirements. For example, the sintered AlN body needs to be homogeneous and dense (i.e., greater than about 95 percent of theoretical density). The body should also have a high mechanical strength. The thermal conductivity should be as high as possible while still having a high volume resistivity (i.e., exceeding about $10^{12}$ Ω-cm volume resistivity). The surface of the as-sintered body is desirably smooth and flat to reduce the cost and time associated with finishing.

Known methods of obtaining AlN sintered bodies include heating a body formed from a mixture of aluminum nitride and a sintering aid or sintering aids (e.g., yttrium oxide) at atmospheric (pressureless) or super-atmospheric pressures. Desirably, sintering is done at atmospheric pressure to reduce the cost to manufacture. In other words, pressure techniques such as "hot pressing," which are expensive and not as suitable for mass production as atmospheric pressure processes, are desirably avoided. However, sintering at atmospheric pressure typically requires a greater amount of sintering aid(s) which react with oxygen in the AlN to form an aluminate phase (metal-aluminum-oxide) to sufficiently densify the body resulting in a body having a lower thermal conductivity. The thermal conductivity is lowered because of the presence of a greater amount of a low thermal conductivity oxide phase in the grain boundaries of the dense body. This is a serious limitation since an electronic substrate must dissipate the heat generated by semiconductor devices, such as microprocessors, which are continually becoming faster and more compact, causing greater heat generation per unit volume. Thus, higher thermal conductivity substrate materials are becoming necessary to prevent device failure.

It is known that the presence of free carbon is effective in reducing the oxygen content of the AlN sintered body, thereby increasing the thermal conductivity. However, the use of carbon additives requires increased densifying temperatures and/or longer times, which is not economically desirable. Another drawback accompanying the use of carbon additives to achieve high thermal conductivities is the resulting surface roughness of the sintered body, as a result of carbon additive reduction of the oxide phase existing between AlN grains. The greater surface roughness requires additional finishing steps such as machining or polishing.

While most prior art focuses on obtaining AlN sintered bodies with higher thermal conductivities and densities, other properties affect the suitability of a substrate for use in electronic applications, such as electronic device substrates. For example, AlN sintered bodies may be either transparent/translucent (e.g., sintering using yttrium oxide sintering aid) or opaque. Transparent/translucent AlN sintered bodies are less suitable for use as electronic substrates because they may permit light to be transmitted through the lower surface of the substrate to the electronic devices (e.g., microprocessor) mounted on the upper surface of the substrate. This can cause the microprocessor to operate erroneously due to a photoelectric effect. As such, transparent/translucent AlN sintered bodies are more appropriate as an optical filter while an opaque AlN sintered body is preferred as an electronic substrate.

As discussed above, traditional methods have not produced AlN based pressureless sintered bodies capable of meeting the requirements demanded by advancing technology. As such, there is a need for an easily processable, light shielding aluminum nitride sintered body having a high density and a high thermal conductivity.

SUMMARY OF THE INVENTION

The object of this invention is a sintered body comprising aluminum nitride and a rare earth element aluminum oxynitride phase; the rare earth element being at least one of Dy, Sm, Pr or Nd and, optionally, at least one of Ce or Eu, the sintered body having a thermal conductivity of at least 170 W/mK, a density of at least 90% of theoretical density, the amount of rare earth element being about 1.4 to about 4.0 mole percent according to the equation, $$\text{Mole \% of Rare Earth} = \frac{\Sigma\, MO_{1.5}\ \text{moles}}{\Sigma\, MO_{1.5}\ \text{moles} + AlN\ \text{moles}}\ (100)$$

where M is the rare earth element, O is oxygen and $MO_{1.5}$ is a rare earth oxide in which the rare earth element has a valence of $^+3$ with the proviso that the amount of Ce, Eu, or mixture thereof, is at most about 55% by moles of the rare earth present in the admixture as expressed by $MO_{1.5}$.

The sintered body of this invention is formed by mixing an aluminum nitride powder with an oxide of Dy, Pr, Nd, Sm, or mixture thereof, and, optionally, an oxide of Eu, Ce, or mixture thereof, to form an admixture and heating the admixture in a non-oxidizing, non-reducing atmosphere to a temperature for a time sufficient to densify the admixture to greater than 90% of theoretical, wherein the amount of rare earth element in the admixture is about 1.4 to about 4.0 mole percent according to the equation, $$\text{Mole \% of Rare Earth} = \frac{\Sigma\, MO_{1.5}\ \text{moles}}{\Sigma\, MO_{1.5}\ \text{moles} + AlN\ \text{moles}}\ (100)$$

where M is the rare earth element, O is oxygen and $MO_{1.5}$ is a rare earth oxide in which the rare earth element has a valence of $^+3$ with the proviso that the amount of Ce, Eu, or mixture thereof, is at most about 55% by moles of the rare earth present in the admixture as expressed by $MO_{1.5}$.

Besides electronic substrates, the AlN sintered body of the present invention may also be used in applications such as refractory crucibles, electrostatic chucks, heat sinks and wave guides.

DETAILED DESCRIPTION OF THE INVENTION

The Sintered Body

The sintered body of this invention contains AlN and a rare earth element aluminum oxynitride represented by the chemical formula $M_2AlO_3N$, wherein M is at least one rare earth element selected from the group consisting of Ce, Pt, Nd or Sm. The body may also contain a rare earth aluminum oxynitride phase wherein the rare earth is Eu or Ce. Preferably the rare earth element aluminum oxynitride is present at the grain boundaries of the AlN densified body. Generally, the sintered AlN body also contains an aluminate grain boundary phase (i.e., a rare earth metal aluminum oxide), such as $MAlO_3$, where M is the rare earth element described previously and may also include Eu or Ce. As an illustration, when the rare earth is Sm, the sintered aluminum nitride body preferably has a $Sm_2AlO_3N$ and an aluminate phase such as $SmAlO_3$. The presence of these phases in the body can be determined by X-ray diffraction or transmission electron microscopy (TEM).

Preferably the rare earth element present in the sintered body is samarium or samarium with cerium or europium. More preferably the rare earth is samarium.

The total amount of rare earth element in the body is expressed by the following equation:

$$\text{Mole \% of Rare Earth} = \frac{\Sigma \, MO_{1.5} \, \text{moles}}{\Sigma \, MO_{1.5} \, \text{moles} + AlN \, \text{moles}} (100)$$

where M is the rare earth element, O is oxygen and $MO_{1.5}$ is a rare earth oxide in which the rare earth element has a valence of $^+3$ with the proviso that the amount of Ce, Eu, or mixture thereof, is at most about 55% by moles of the rare earth present in the admixture as expressed by $MO_{1.5}$. The total amount of rare earth element, according to the above equation, is at least about 1.4 mole percent to about 4.0 mole percent of the body. Preferably the amount is at least 1.8%, more preferably at least about 2.0%, and most preferably at least about 2.2% to preferably at most about 3.6%, more preferably at most about 3.0%, and most preferably at most about 2.8 mole percent. The amount of rare earth can be determined by X-ray fluorescence and, consequently, the amount of rare earth metal oxide, according to the equation, can easily be calculated. To illustrate, an AlN body made using 0.4 part by mole of $Pr_6O_{11}$ and 99.6 parts by mole of AlN would have a rare earth content of about 2.4% because 1 mole of $Pr_6O_{11}$ would be equivalent to 6 moles of $PrO_{1.5}$ used to calculate the rare earth element percent in the above equation.

When Ce, Eu, or mixture thereof, is present in the sintered body, the amount of these is less than about 55% by moles of the total amount of moles of rare earth present in the body as expressed by $MO_{1.5}$ in the above equation. To illustrate, an AlN body made using 98.5 parts by mole of AlN, 1.0 part by mole of $CeO_2$ and 0.5 part by mole of $Sm_2O_3$ would be in the scope of the present invention (i.e., 100 multiplied by 1.0 parts $CeO_2$/2.0 parts total rare earth [$CeO_{1.5}$ and $SmO_{1.5}$]). In contrast, an AlN body made using 98.5 parts AlN, 1.1 parts $CeO_2$ and 0.4 part $Sm_2O_3$ would not be in the scope of the present invention (i.e., 100 multiplied by 1.1 parts/1.9=58%).

The sintered body has a thermal conductivity of at least about 170 W/m-K to at most about 300 W/m-K. Preferably the thermal conductivity is at least 190, more preferably at least about 200 W/m-K, as determined by a laser flash technique described by W. J. Parker et al. in "Flash Method of Determining Thermal Diffusivity, Heat Capacity, and Thermal Conductivity," *Journal of Applied Physics*, Vol., 32, pp. 1679–1684 (1961).

The density of the sintered AlN body is at least 90% of theoretical density. Preferably the density of the sintered body is at least 95%, more preferably at least 98%, and most preferably at least 99% of theoretical density, as described on page 530 of *Introduction to Ceramics* $2^{nd}$ *Ed.*, W. D. Kingery et al., John Wiley and Sons, New York, 1976.

The sintered body preferably is opaque. Opaque herein is the substantial absence of transmittance of visible light having a wavelength of 0.6 micrometer through a 0.5 mm thick body. The measurement is performed in a manner described in U.S. Pat. No. 4,618,592, at col. 11, lines 38–59, incorporated herein by reference. Substantial absence is when less than about 1% of the light is transmitted through the body.

Preparation of The Sintered Body

In preparing the sintered body of the present invention, an aluminum nitride powder is mixed with an oxide of Dy, Pt, Nd, Sm, or mixture thereof, and, optionally, an oxide of Eu, Ce, or mixture thereof, to form an admixture.

The AlN powder desirably contains an amount of transition metal impurities less than about 10,000 ppm (part per million by weight to greater than 0 ppm. Preferably the amount of said impurities is less than about 1000, more preferably less than about 500, and most preferably less than about 200 ppm. The AlN powder desirably has as low a chemically bound oxygen content to avoid the formation of an aluminate phase over an oxynitride in the sintered body. The amount of oxygen in the AlN may be from about 4% to about 0.5% by weight, as determined by combustion analysis using apparatus available from Leco Corp., St. Josephs, Mich. The oxygen content is preferably less than about 3% and more preferably less than about 2%. The AlN powder also, advantageously, has a surface area of from about 1.5 to about 10 square meters per gram ($m^2/g$). The powder surface area is preferably from about 2 $m^2/g$ to about 9 $m^2/g$. The specific surface area is measured by a nitrogen adsorption method such as that taught by S. Brunauer, P. H. Emmett and E. Teller in *Journal of the American Chemical Society*, Volume 60, page 309 (1938), which is known as the method.

AlN powders, which are suitable in forming the AlN sintered body, include commercial powders such as those sold under the trade names XUS 35544 and XUS 35548 from The Dow Chemical Company, Midland, Mich. and Grade F and Grade H AlN from Tokuyama Soda Kabushiki Kaisha, Yamaguchi, Japan.

The rare earth oxide desirably has a purity of at least 99% by weight. Preferably the purity of the oxide is at least about 99.5% and more preferably at least about 99.9% pure by weight. The oxide desirably is a powder in which all of the powder passes through a 325 mesh screen. That is to say, the powder particles are less than 44 microns in diameter. The amount of the rare earth oxide mixed with the AlN is equivalent to an amount sufficient to provide an amount of rare earth element in the sintered body, as described previously. Preferably the rare earth oxide is samarium oxide ($Sm_2O_3$) or samarium oxide mixed with cerium oxide ($CeO_2$) or europium oxide ($Eu_2O_3$). More preferably the rare earth oxide is samarium oxide.

The AlN powder and the sintering aid(s) may be mixed in a known apparatus such as a ball mill, attrition mill, ribbon blender, vertical screw mixer, V-blender and fluidized zone mixer, such as those sold under the trade designation FORBERG. Ball milling in a solvent such as ethanol, heptane and other low molecular weight organic solvents with milling media, such as aluminum nitride and alumina, generally provides satisfactory results. The milling media preferably have transition metal impurities which don't significantly contaminate the mixture. For example, it is preferred that the AlN or alumina media contain less than about 1000 ppm (parts per million by weight) of a transition metal.

An organic binder may also be used during processing of the admixture into greenware. Suitable binders are well-known in the art and, typically, comprise high molecular weight organic materials that are soluble in organic solvents. Illustrative binders include polyethyloxazoline, industrial waxes such as paraffin, highly viscous polyglycols, polymethylmethacrylate and polyvinyl butyral. The binder is typically added to admixture components prior to or during milling. After mixing, the organic liquid may be removed by oven drying or spray drying resulting in an admixture suitable to form a ceramic greenware.

Greenware is generally prepared by forming methods such as extrusion, injection molding, die pressing, isostatic pressing, slip casting, roll compaction and tape casting to produce a desired shape. Particularly satisfactory results are obtained by dry pressing a spray dried admixture or tape casting a slurry (admixture powder dispersed within a liquid), as described in *Introduction to the Principles of Ceramic Processing*, J. Reed, Chapters 20 and 21, incorporated herein by reference.

Organic material such as binders and surfactants in the ceramic greenware is, generally, removed by heating the greenware to a temperature that ranges from about 50° C. to about 1000° C. to pyrolyze, volatilize or thermally decompose the organic material. The temperature varies depending upon the organic material. Removal of the organic material is, typically, performed at or near ambient pressure or in a vacuum. Commonly, the removal is performed in atmospheric air or in a nonoxidizing atmosphere. The nonoxidizing atmosphere is desirably established with an inert gas. The inert gas may be nitrogen, a source of nitrogen such as ammonia, or a noble gas such as argon. The inert gas is preferably nitrogen. Typically, the atmosphere is flowing during binder removal.

The AlN greenware bodies are then sintered for a time sufficient to densify the green bodies to form the sintered bodies having a thermal conductivity greater than about 170 W/mk and a rare earth metal Al oxynitride grain boundary phase. The bodies are preferably sintered for a time from about 1 hour to about 8 hours, more preferably for a time from about 3 hours to about 6 hours.

The greenware bodies are sintered at a temperature sufficient to densify the green bodies to form the sintered body. Generally, a temperature of about 1600° C. to about 1900° C. is suitable. To induce the rare-earth oxynitride phase formation and, consequently, cause a body to have a high thermal conductivity, the sintering temperature is preferably about 1750° C. to about 1900° C., more preferably 1775° C. to about 1875° C. The heating and cooling rate is not particularly critical to form the AlN sintered body. Suitable heating and cooling rates may be 2.5° C./min to about 25° C./min.

The AlN bodies are sintered in an essentially non-oxidizing non-reducing environment. The essentially non-reducing environment is one in which the amount of reducing carbon and hydrogen species present in the environment is less than the amount which prevents the formation of the sintered body containing the rare earth aluminum oxynitride phase. The hydrogen and carbon are believed to react with the oxide and AlN present in the body altering the phase chemistry, such that the rare earth aluminum oxynitride phase is not favorably formed. For example, the furnace hot zone, or materials in the hot zone, must not be a carbonaceous material, such as graphite or silicon carbide, because this would introduce a reducing environment to the sintering part.

In addition, the essentially non-oxidizing environment is one in which the amount of oxide species is not so great that the aluminate phase is favorably formed over the oxynitride phase. For example, a body sintered in a powder bed of AlN and the same rare earth oxides is not desirable because the oxides may cause an oxidizing atmosphere around the sintering body.

Examples of the essentially non-reducing non-oxidizing environment include parts sintered in an enclosure constructed of boron nitride, refractory metal (e.g., molybdenum, tantalum and tungsten) or aluminum nitride under an inert or non-oxidizing gas such as a noble gas (e.g., argon) and a nitrogen containing gas (e.g., nitrogen). Preferably the gas is nitrogen. The enclosure preferably completely encompasses (e.g., crucible with a top) the AlN greenware to be sintered. The furnace hot zone (chamber) may be constructed of the same enclosure materials just described. Preferably the enclosure is constructed of a refractory metal. More preferably the enclosure is constructed of a refractory metal coated with a metal nitride such as AlN or BN. Most preferably the enclosure is constructed of either Mo or W coated with AlN.

Any furnace which is capable of heating the enclosure and AlN admixture to a temperature sufficient to form the AlN sintered body of this invention is suitable as long as the furnace provides a non-oxidizing, non-reducing environment to the sintering body (i.e., should not be a graphite furnace). Suitable furnaces include high temperature oxide (e.g., alumina muffle furnaces such as those produced by CM Furnace Inc., Bloomfield, N.J.) or refractory metal furnaces (i.e., furnaces that have hot zones constructed of refractory metals such tungsten and molybdenum). Preferably the furnace is a refractory metal furnace.

The following examples further illustrate the invention. These examples are not intended to limit the invention in any manner.

EXAMPLES

Example 1

90 Parts by weight (98.7 parts by mole) of AlN powder (Dow 35544 Grade AlN) and 10 parts by weight (1.3 parts by mole) of $Sm_2O_3$ powder (Aldrich), with 0.5 to 1.0 parts by weight of polyvinyl butyral (PVB), available from Monsanto, St. Louis, Mo. under the trade name BUTVAR™ B-98, are dispersed in an amount of a 50% by weight methyl ethyl ketone (MEK)/50% by weight ethanol solvent sufficient to form a fluid slurry. The slurry is ball milled for 1 to 2 hours using AlN milling media. The milled slip is dried at 70° C.–80° C. under vacuum to remove the solvent. The dried powder is crushed by mortar and pestle and, subsequently, sieved through a 100 mesh screen. The powder is pressed in a steel die under a uniaxial pressing pressure of 15 Ksi. The PVB binder is removed by heating the pressed pellets to a temperature of 500°–600° C. for 4 hours under flowing nitrogen. The debindered pellets are placed on Mo setters coated with AlN powder and stacked vertically using W spacers. The pellets are then placed in a refractory metal furnace with W heating elements and W/Mo shielding and sintered at 1850° C. for 6 hours under nitrogen at a pressure of 1 atmosphere.

The sintered pellets are dark green to black and are opaque. The density of the pellets is about 3.4 to about 3.47 g/cc (i.e., 98% to 100% theoretical density). The thermal conductivity of the pellets ranges from about 200 to about 250 W/m-K. The pellets have a $Sm_2AlO_3N$ and a $SmAlO_3$ grain boundary phase.

Comparative Example 1

The process of Example 1 is repeated except that 95 parts by weight (99.35 parts by mole) of AlN is mixed with 5 parts by weight (0.65 part by mole) of $Sm_2O_3$. These bodies did not densify. The body has a $SmAlO_3$ phase but not a $Sm_2AlO_3N$ phase.

Comparative Example 2

The process of Example 1 is repeated except that the 80 parts by weight (97.4 parts by mole) of AlN is mixed with 20 parts by weight (2.6 parts by mole) of $Sm_2O_3$. The sintered bodies have a density ranging from about 96% to about 98% of theoretical. The bodies have thermal conductivities ranging from about 144 to about 168 W/m-K. The bodies contain $Sm_2O_3$ and $Sm_2AlO_3N$.

Example 1 and Comparative Examples 1 and 2 show that the amount of rare earth element is a critical factor in achieving a body containing the rare earth element aluminum oxynitride phase and also a high thermal conductivity.

Examples 2–6

The process of Example 1 is repeated for each of these examples except that the sintering is carried out at 1865° C. for 4 hours and the amount of AlN and rare earth metal oxide is varied, as shown in Table 1. Table 1 also shows the characteristics of the sintered AlN bodies of these Examples.

Comparative Examples 3–5

The process of Example 3 is repeated for each of these Comparative Examples except that the amount of AlN and rare earth metal oxide is varied, as shown in Table 2. Table 2 also shows the characteristics of the sintered AlN bodies of these Comparative Examples.

TABLE 1

| Example | AlN (pbM) | Sinter aid #1 | pbM of Aid #1 | Sinter aid #2 | pbM of Aid #2 | Density (% th) | TC (W/m-K) |
| --- | --- | --- | --- | --- | --- | --- | --- |
| 2* | 99.6 | $Pr_6O_{11}$ | 0.4 | — | — | 96% | 179 |
| 3 | 98.7 | $Nd_2O_3$ | 1.3 | — | — | 97% | 187 |
| 4 | 98.7 | $Sm_2O_3$ | 1.3 | — | — | 96% | 203 |
| 5 | 98.7 | $Dy_2O_3$ | 1.3 | — | — | 100% | 182 |
| 6 | 98.1 | $Sm_2O_3$ | 0.6 | $CeO_2$ | 1.3 | 99% | 178 | pbM = part by mole
TC = Thermal Conductivity
% th = percent of theoretical
Note: 0.4 pbM of $Pr_6O_{11}$ = 2.4 pbM of $PrO_{1.5}$.

TABLE 2

| Comp. Example | AlN (pbM) | Sinter aid #1 | pbM of Aid #1 | Sinter aid #2 | pbM of Aid #2 | Density (% th) | TC (W/m-K) |
| --- | --- | --- | --- | --- | --- | --- | --- |
| 3 | 98.7 | $Y_2O_3$ | 1.3 | — | — | 90% | 155 |
| 4 | 97.4 | $CeO_2$ | 2.6 | — | — | 89% | 157 |
| 5 | 98.7 | $Eu_2O_3$ | 1.3 | — | — | 82% | 116 | pbM = part by mole
TC = Thermal Conductivity
% th = percent of theoretical

The results in Table 1 show that AlN sintering compositions of the present invention attain a high sintered density and high thermal conductivity, while the results in Table 2 show that AlN sintering compositions, without the sintering additives of this invention, fail to attain a high sintered density and thermal conductivity under the same sintering conditions.

What is claimed is:

1. A sintered body comprising aluminum nitride and a rare earth element aluminum oxynitride phase, the rare earth element being at least one selected from the group consisting of Dy, Sm, Pr and Nd and, optionally, at least one selected from the group consisting of Ce and Eu, the sintered body having a thermal conductivity of at least 170 W/mK, a density of at least 90% of theoretical density, the amount of rare earth element being about 1.4 to about 4.0 mole percent according to the equation, $$\text{Mole \% of Rare Earth} = \frac{\Sigma\, MO_{1.5}\ \text{moles}}{\Sigma\, MO_{1.5}\ \text{moles} + AlN\ \text{moles}}\,(100)$$

where M is the rare earth element, O is oxygen and $MO_{1.5}$ is a rare earth oxide in which the rare earth element has a valence of $^+3$ with the proviso that the amount of Ce, Eu, or mixture thereof, is at most about 55% by moles of the rare earth present in the sintered body as expressed by $MO_{1.5}$.

2. The sintered body of claim 1 further comprising an aluminate phase.

3. The sintered body of claim 1 wherein the body has a thermal conductivity of at least about 190 W/m-K.

4. The sintered body of claim 3 wherein the body has a thermal conductivity of at least 200 about W/m-K.

5. The sintered body of claim 1 wherein the rare earth element aluminum oxynitride phase is $Sm_2AlO_3N$.

6. The sintered body of claim 1 wherein the body has a density of at least 95% of theoretical density.

7. The sintered body of claim 6 wherein the body has a density of at least 98% of theoretical density.

8. A process for making a sintered body comprising aluminum nitride and a rare earth element aluminum oxynitride phase, the rare earth element being at least one selected from the group consisting of Dy, Sm, Pr or Nd and optionally at least one selected from the group consisting of Ce and Eu, the sintered body having a thermal conductivity of at least 170 W/mK and a density of at least 90% of theoretical density, said process comprising: mixing an aluminum nitride powder with an oxide of Dy, Pt, Nd, Sm, or mixture thereof, and, optionally, an oxide of Eu, Ce, or mixture thereof, to form an admixture and heating the admixture in a non-oxidizing non-reducing environment to a temperature and time sufficient to densify the admixture to greater than 90% of theoretical density, wherein the amount of rare earth element in the admixture is about 1.4 to about 4.0 mole percent according to the equation, $$\text{Mole \% of Rare Earth} = \frac{\Sigma\, MO_{1.5}\, \text{moles}}{\Sigma\, MO_{1.5}\, \text{moles} + AlN\, \text{moles}} (100)$$

where M is the rare earth element, O is oxygen and $MO_{1.5}$ is a rare earth oxide in which the rare earth element has a valence of $^+3$ with the proviso that the amount of Ce, Eu, or mixture thereof, is at most about 55% by moles of the rare earth present in the admixture as expressed by $MO_{1.5}$.

9. The process of claim 8 wherein the oxide of the rare earth is $Sm_2O_3$.

10. The process of claim 8 wherein the heating is carried out under nitrogen at atmospheric pressure.

11. The process of claim 8 wherein the heating is performed in a refractory metal furnace.

12. The process of claim 11 wherein the admixture is heated in an enclosure made of a refractory metal coated with aluminum nitride.

13. The process of claim 8 wherein the admixture is formed into a shaped body before heating.

* * * * *

UNITED STATES PATENT AND TRADEMARK OFFICE
CERTIFICATE OF CORRECTION

PATENT NO : 5,705,450
DATED : January 6, 1998
INVENTOR(S): Yi-Hung Chiao

It is certified that error appears in the above-identified patent and that said Letters Patent is hereby corrected as shown below:

Col. 8, line 65, "Pt" should read -- Pr --.

Signed and Sealed this

Fourteenth Day of April, 1998

Attest:

BRUCE LEHMAN

*Attesting Officer*     *Commissioner of Patents and Trademarks*